United States Patent Office 2,952,971
Patented Sept. 20, 1960

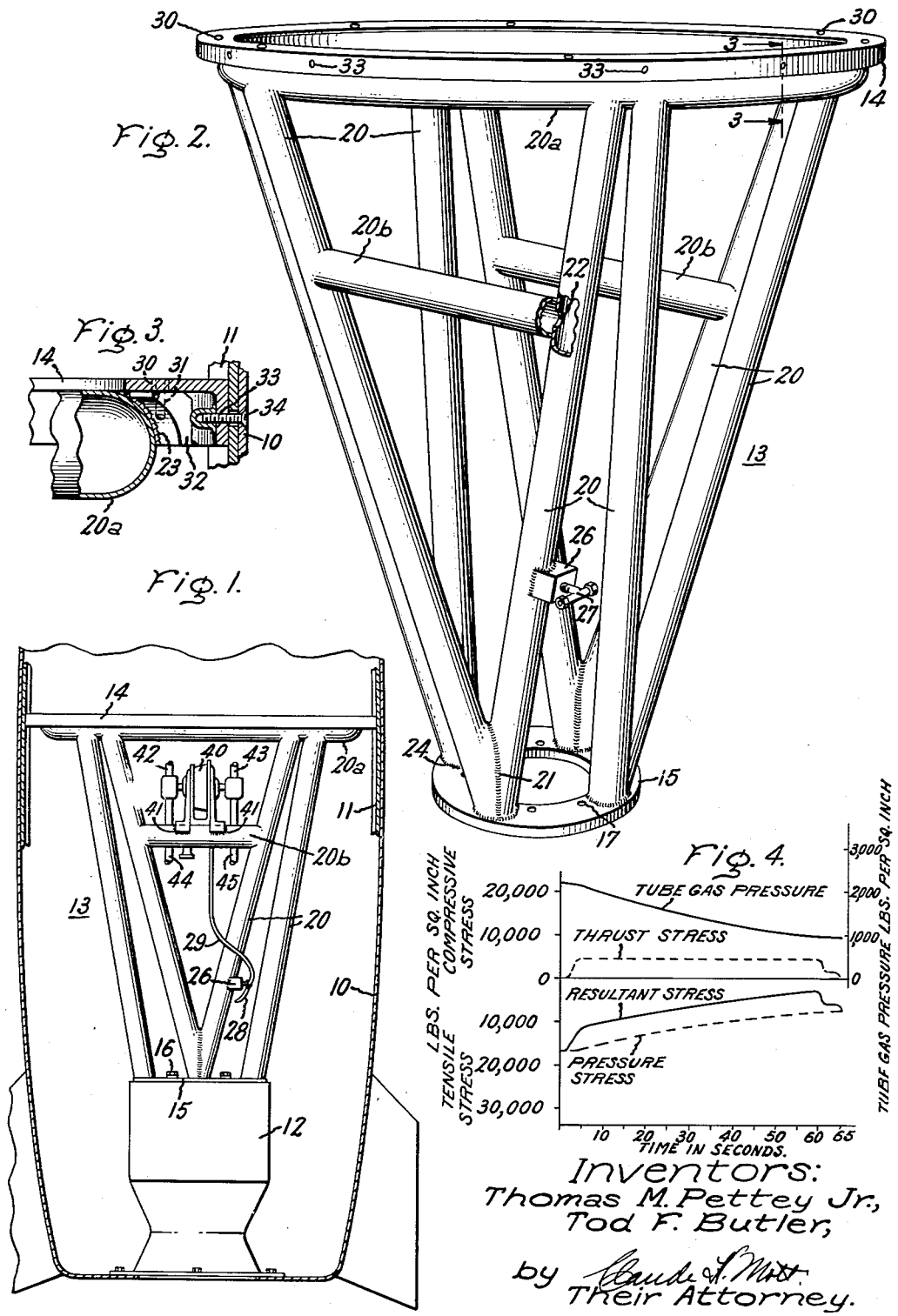

2,952,971
COMBINED TANK AND SUPPORT STRUCTURE FOR ROCKET MOTOR

Thomas M. Pettey, Jr., Scotia, and Tod F. Butler, Poestenkill, N.Y., assignors, by mesne assignments, to the United States of America as represented by the Secretary of the Army Filed Oct. 19, 1954, Ser. No. 463,196

1 Claim. (Cl. 60—35.6)

This invention relates to support structures, more particularly to support structures for rocket vehicles, and has for its object the provision of a support structure having high resistance to compressive stresses and at the same time saving weight, space, and material.

The invention has particular application in rocket vehicles for supporting the rocket motor and transmitting the axial thrust of the motor to the rocket vehicle. In the past, rocket motors have been mounted within rocket vehicles by heavy structural members which have included part of the outer body of the vehicle itself. Due to the tremendous thrust generated by the normal rocket motor, the axial stresses set up in the rocket motor support structure are quite considerable and have made necessary the provision of the heavy structural members to withstand these axial stresses. Also, the storage tanks for the high pressure gas required in many rocket engine systems have occupied space which is, of course, quite precious in any aircraft, particularly in rocket vehicles.

Another object of this invention is to provide a lightweight support structure which also serves as a storage tank for high pressure fluid used in the operation of a rocket engine system, and which structure is strengthened by the pressure of the fluid stored in it.

While the present invention is illustrated and described in connection with its preferred usage in a rocket vehicle, it will be readily appreciated that the invention has application in other fields where a support structure is needed having high resistance to compressive stresses.

Briefly stated in accordance with one aspect of this invention as applied to a rocket vehicle, a support structure is provided comprising a plurality of lightweight elongated hollow tubes adapted to receive and retain fluid under pressure, which pressure places the support structure in tension thus enabling it to have high resistance to compressive stresses. Preferably the fluid under pressure in the structure is a gas used in the rocket engine system whereby the structure serves also as a gas storage tank.

The invention will be better understood and additional objects and features thereof will become apparent upon perusal of the following description taken in connection with the drawing, and the scope of the invention will be pointed out in the appended claim.

In the drawings which are illustrative of one embodiment of the invention,

Fig. 1 is a fragmentary view of a rocket vehicle showing the manner of support of the rocket motor by the support structure of this invention.

Fig. 2 is an enlarged perspective view of the support structure of Fig. 1.

Fig. 3 is a fragmentary view in section taken along the line 3—3 of Fig. 2, and also showing the method of attachment of the support structure to the rocket vehicle body.

Fig. 4 is a plot of curves showing the various operating stresses in lbs./sq. inch plotted against time.

Referring more particularly to the drawings, there is shown a fragmentary portion of a rocket vehicle having an outer body or skin 10 with an inner lining 11 and carrying a rocket motor 12. A support structure 13 is provided for mounting the rocket motor 12 within the rocket vehicle. This support structure includes a pair of spaced apart end members which are preferably in the form of a larger ring 14 and a smaller ring 15, and a plurality of hollow elongated tubes 20 extending between and secured to these end members. These tubes 20 are preferably secured to each other as by welding 21 in such manner that their inner chambers are interconnected for the free flow of fluids therein. Holes such as 22 in the walls of the tubes serve to promote this free flow of fluids. The tubes 20 are secured to the end member or ring 14 through the brackets 32 by welding 23, and are secured to the ring 15 as by welding 24. There are four pairs of tubes 20, each pair having its lower ends connected together and to the ring 15. The tubes then extend upwardly in diverging relation and are secured to an annular tube 20a which is secured in turn to the end ring 14. Cross tubes 20b add additional strength to the structure and also promote the free flow of fluid through the tubes.

The plurality of tubes 20 are adapted for receiving and storing fluid under pressure by means of an entrance box 26 to which is fitted a coupling 27 which is threaded to receive conduits 28 and 29 for supplying or discharging fluid under pressure. Such fluid may be nitrogen gas which is supplied to the rocket engine system during its operation.

The end ring 14 of the support structure is adapted for fastening to the frame or outer body 10 of the rocket vehicle by the provision of holes 33 through which are passed capscrews 34. Bolts 31 pass through the holes 30 to secure the ring 14 to brackets 32 which are welded to the annular tube 20a. The end ring 15 is adapted for fastening to the rocket motor 12 as by bolts 16 extending through holes 17 in the ring.

The support structure is so constructed and arranged that the pressures acting axially, i.e. longitudinally, within the tubes are effective to put the tubes in tension lengthwise whereby the structure is capable of withstanding high axial compressive forces even though the tubes have unusually thin walls and are light in weight and would otherwise collapse. This result is achieved by arranging the tubes so that their major tension components acting axially of the tubes are also acting in the direction in which it is desired to resist the compressive forces expected. The use of thin, lightweight tube walls makes possible considerable savings in weight and material, thus promoting economy and efficiency, as well as providing the maximum fluid storage space inside of the tubes.

In operation the rocket motor 12 exerts an upwardly directed force, as viewed in Fig. 1, in the support structure 13, which force is applied to the lower ends of the tubes by the ring 15 as a substantially endwise or axial compression force.

In Fig. 4 are shown curves giving the various pressures in lbs./sq. inch of a typical run of a rocket motor wherein the support structure of this invention was used. This particular test run lasted sixty-five seconds and the tubes were initially filled with gas, in this instance, nitrogen gas, to a pressure of 2200 lbs./sq. inch and during the run this pressure was reduced to approximately 850 lbs./sq. inch due to consumption of the gas by the rocket motor propulsion system as may be seen from the curve labeled "Tube Gas Pressure." The tubes used were of chrome molybdenum steel having an outside diameter of 2½ inches and a wall thickness of only .083 inch. It will be observed from the "Thrust Stress" curve that throughout this run of the rocket motor the thrust of the rocket motor was a compressive stress. The curve marked "Pressure Stress" and shown in dotted lines also, represents the stress on the support structure caused by the high pressure gas stored within the tubes, and it will be observed, of course, that this stress is a tensile stress throughout the run of the rocket motor. The "Resultant Stress" curve which is shown in a solid line, represents the resultant between the compressive thrust stress and the tensile pressure stress, and it will be observed that this resultant stress is a tensile stress throughout the rocket motor run. Thus, it is seen that in a particular application of the support structure of this invention, the plurality of tubes throughout the run of the rocket motor were maintained in tension, i.e. the tension force of the compressed gas was greater than the compression force applied by the rocket motor.

An additional advantage of the support structure of this invention is that the tubes themselves readily provide a supporting frame work for the various components of the system in which it is used. For example, in the rocket vehicle application, the support structure can be used to fasten the turbopump and the related propellant conduits which are necessary in the operation of a rocket motor. A method used in the past for mounting such components may be seen on page 28 of the book, "Rocket Propulsion Elements," by Sutton, 2nd printing, Fig. 2–3 showing the V–2 propulsion system. In the illustrated embodiment of the present invention, a turbopump 40 is secured to the cross tube 20b of the support structure 13 as by welding 41. Conduits 42 and 43 convey propellants, e.g. oxidizer and fuel, into the pumps and conduits 44 and 45 supply these propellants to the rocket motor in the manner described in the Sutton book noted above. Nitrogen gas is supplied to the turbopump nozzle box by conduit 29 leading from the tubes 20 of the support structure 13.

While a particular embodiment of the invention has been illustrated and described, modifications thereof will readily occur to those skilled in the art. It should be understood therefore that the invention is not limited to the particular arrangement disclosed but that the appended claim is intended to cover all modifications which do not depart from the true spirit and scope of the invention.

What is claimed as new and desired to be secured by United States Letters Patent is:

A support structure for mounting a rocket motor in a rocket vehicle, comprising a smaller end member and a larger end member arranged in coaxially spaced relation, said motor being attached to said smaller end member for support within said vehicle and said larger end member being carried by said vehicle, an annular tube dependingly carried by said larger end member, a plurality of spaced pairs of convergent support tubes extending between said end members, each of pair of said support tubes being joined together at their convergent ends to afford communication therebetween and secured to said smaller end member, the divergent ends of each pair of said support tubes connected to said annular tube to be in communication therewith, said support tubes and said annular tube containing fluid under pressure, means for providing said tubes with the fluid under pressure to provide axial tension forces in all of said tube and thereby increase the axial compressive strength of all of said tubes, a cross tube extending between and in communication with the tubes of one pair of said divergent support tubes, a pump carried by said cross tube for pumping the fluid from all of said tubes, conduit means connecting said pump to said rocket motor, the fluid under pressure in said pairs of tubes and said annular tube and said cross tube being a propellant for use in the rocket motor and to be fed to said motor by said pump through said conduit means.

References Cited in the file of this patent

UNITED STATES PATENTS

| 1,343,682 | Richmond | June 15, 1920 |
| 2,398,125 | Summerfield et al. | Apr. 9, 1946 |

FOREIGN PATENTS

| 700,444 | Great Britain | Dec. 2, 1953 |